United States Patent
Tripathi et al.

(10) Patent No.: US 7,069,331 B2
(45) Date of Patent: Jun. 27, 2006

(54) TRUNK GROUP IMPLEMENTATION IN NETWORKS

(75) Inventors: Anoop Tripathi, Mount Prospect, IL (US); Michael D. Homeier, Elmhurst, IL (US); Sudhakar Ramakrishna, Lake Zurich, IL (US); Guanglu Wang, Buffalo Grove, IL (US)

(73) Assignee: UTStarcom, Inc., Alameda, CA (US)

( * ) Notice: Subject to any disclaimer, the term of this patent is extended or adjusted under 35 U.S.C. 154(b) by 586 days.

(21) Appl. No.: 09/951,202

(22) Filed: Sep. 13, 2001

(65) Prior Publication Data

US 2003/0158967 A1  Aug. 21, 2003

(51) Int. Cl.
G06F 15/16 (2006.01)

(52) U.S. Cl. .................................... 709/229

(58) Field of Classification Search ............... 709/220, 709/229, 245, 244; 719/313; 370/352, 338
See application file for complete search history.

(56) References Cited

U.S. PATENT DOCUMENTS

| | | | |
|---|---|---|---|
| 5,526,489 A * | 6/1996 | Nilakantan et al. | 709/228 |
| 5,634,127 A * | 5/1997 | Cloud et al. | 719/313 |
| 6,070,187 A | 5/2000 | Subramaniam et al. | |
| 6,098,116 A | 8/2000 | Nixon et al. | |
| 6,147,993 A | 11/2000 | Kloth et al. | |
| 6,301,609 B1 | 10/2001 | Aravamudan et al. | |
| 6,327,251 B1 | 12/2001 | Bion | |
| 6,335,926 B1 | 1/2002 | Silton et al. | |
| 6,434,618 B1 * | 8/2002 | Cohen et al. | 709/228 |
| 6,438,114 B1 | 8/2002 | Womack et al. | |
| 6,446,127 B1 | 9/2002 | Schuster et al. | |
| 6,453,034 B1 | 9/2002 | Donovan et al. | |
| 6,477,150 B1 | 11/2002 | Maggenti et al. | |
| 6,665,293 B1 * | 12/2003 | Thornton et al. | 370/352 |
| 6,731,621 B1 * | 5/2004 | Mizutani et al. | 370/338 |
| 6,741,585 B1 * | 5/2004 | Munoz et al. | 370/352 |
| 6,799,210 B1 * | 9/2004 | Gentry et al. | 709/223 |

* cited by examiner

*Primary Examiner*—Andrew Caldwell
*Assistant Examiner*—Stephan Willett
(74) *Attorney, Agent, or Firm*—McDonnell Boehnen Hulbert & Berghoff LLP (57) ABSTRACT

A system and method for routing information includes a resource manager. The resource manager includes a configuration table. The configuration table includes at least one group of physical gateway addresses, each of the at least one group of physical gateway addresses has a single and unique logical identifier. The resource manager is coupled to a plurality of gateways. A proxy coupled to the resource manager. The resource manager receives a register request message from a selected one of the plurality of gateways.

28 Claims, 6 Drawing Sheets

| Trunk Identification | Logic Gateway Transport Address | Address of Physical Gateways Belonging To This Trunk Group |
|---|---|---|
| #1 | 100.100.100.50:5060 | 100.100.100.10:5060<br>100.100.100.11:5060<br>100.100.100.12:5060 |
| #2 | 100.100.100.50:5061 | 100.100.100.12:5061 |
| #3 | 100.100.100.50:5062 | 100.100.100.13.5060<br>100.100.100.14.5060 |

FIGURE 5

TRUNK GROUP IMPLEMENTATION IN NETWORKS

FIELD OF THE INVENTION

This present invention relates to routing information across a network. More specifically, it relates to grouping trunk lines in networks.

BACKGROUND OF THE INVENTION

Modern telecommunication networks include many different types of technologies. IP networks represent one type of network where IP packets are transmitted across the network. The public switched telephone network (PSTN) represents another type of network. Networks may also combine different types of technology. For example, a voice over IP network (VOIP) carries voice calls in packet form.

In order to connect users across networks, different functions, for example, trunking, may be performed. Trunking involves transmitting information between two endpoints, for example, between switching centers. Calls and information transmitted in the trunked lines may be managed for maximum efficiency.

Information may be transmitted across networks using different types of protocols, for example, the Session Initiation Protocol (SIP), which is utilized by various network elements. A typical SIP-based system may include SIP gateways, SIP proxy, and a backend system. The SIP gateways may interface with the PSTN network through trunk lines. For example, these trunk lines may be T1, PRI, and T3 lines. Other examples of elements in a SIP system are possible.

A trunk may be a DS0 or any other example of a connector between switching systems. The purpose of the trunk may, for example, be to transmit a call between switching centers.

The SIP proxy may manage the SIP gateways within the IP network and may facilitate call authorization, routing, and billing. The proxy may perform other functions, as well.

The proxy may manage the gateways. For example, the proxy may identify the gateways by the IP address. The proxy may perform other functions, as well.

SUMMARY OF THE INVENTION

The system and method of the present invention advantageously places trunk lines into groups and associates each of these groups with a single logical identifier. The grouping allows messages between components in a network to be reduced significantly.

In one example of the present invention a resource manager is coupled to a proxy. The resource manager may include a configuration table. The configuration table may include at least one group of physical gateway addresses. Each of the trunk groups of physical gateway addresses may have a single and unique logical identifier, such as transport address or access number prefix. The resource manager may be coupled to a plurality of gateways.

The resource manager may receive a register request message from a selected one of the plurality of gateways. The register request message may include a physical address of a selected one of the plurality of gateways. The resource manager may responsively determine the logical identifier of the selected one of the plurality of gateways using the physical address. The resource manager may send a register request message including the logical identifier to the proxy.

Subsequent register request messages received from any of the plurality of gateways having the same logical identifier as the selected one of the plurality of gateways may not forwarded to the proxy by the resource manager.

The resource manager may receive an INVITE message from the proxy. The INVITE message may include a logical address. The proxy may determine a physical address of the gateway.

The foregoing and other features and advantages of the system and method of the present invention will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
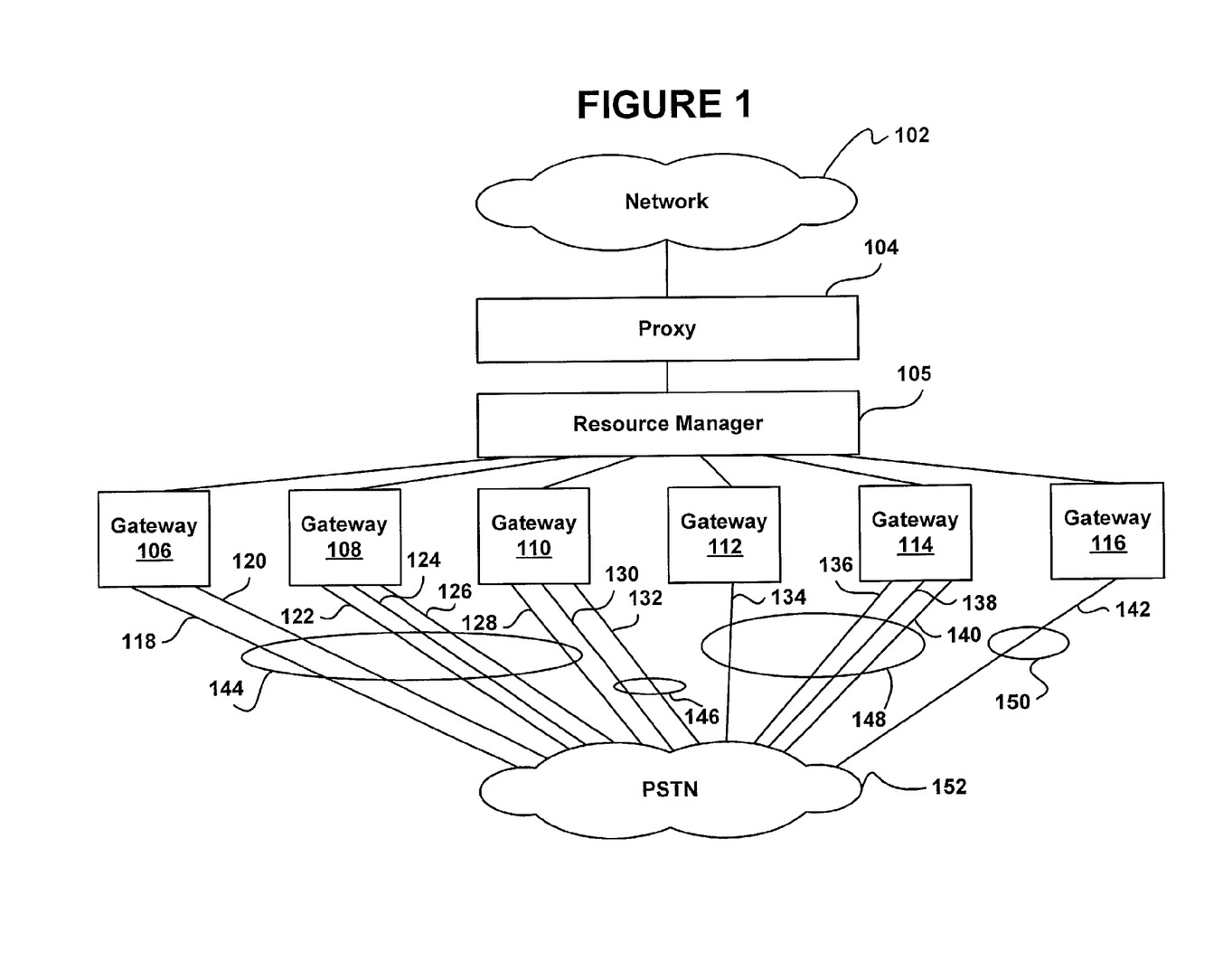
FIG. 1 is a diagram illustrating a preferred embodiment of the system for implementing trunk groups in accordance with the present invention.

Referring now to FIG. 1, a system includes a network 102, a proxy 104, resource manager 105, gateways 106, 108, 110, 112, 114, and 116, trunks 118, 120, 122, 124, 126, 128, 130, 132, 134, 136, 138, 140, and 142. The trunks 118, 120, 122, 124, 126, and 128 form a trunk group 144. The trunks 130 and 132 form a trunk group 146. The trunks 134, 136, 138, and 140 form a trunk group 148. The trunk 142 forms a trunk group 150.

The network 102 is coupled to the proxy 104. The proxy 104 is coupled to the resource manager 105. The gateways 106, 108, 110, 112, 114, and 116 are coupled to the resource manager 105. The PSTN 152 is coupled to the gateways 106, 108, 110, 112, 114, and 116 by the trunks in the trunk groups.

It will be understood that other resource managers (not shown) may be coupled to other gateways (not shown). These other gateways may also be coupled to the PSTN 152.

The network 102 may be any type of network carrying any type of information. For example, the network may be the Internet.

The functions of the proxy 104 may be carried out by a processor executing computer instructions stored in a memory. The proxy 104 may implement the SIP protocol.

Other types of protocols may also be used. As described elsewhere in this specification, the proxy processes information from logical gateways.

The functions of the gateways 106, 108, 110, 112, 114, and 116 may be implemented using a processor executing computer instructions stored in a memory. The gateways may be logical gateways or physical gateways. For example, the gateway 106 may include several physical gateways. In another example, the gateway 106 may be a logical gateway and this logical gateway includes multiple physical gateways.

The functions of the resource manager 105 may be implemented by a processor executing computer instructions stored in a memory. The resource manager 105 may use the SIP protocol to communicate with the proxy 102 and the gateways. The proxy 102 may treat the resource manager 105 as a SIP user agent while the gateways may treat resource manager 105 as a proxy.

The resource manager 105 may provide call routing based upon the load across a trunk group rather than one physical gateway. For example, the resource manager 105 may route messages between the trunk lines 118, 120, 122, 124, 126, and 128 (in trunk group 144) and the proxy 104.

The resource manager 105 may facilitate this call routing based on trunk group configurations and real time gateway information. For a call that is initiated from any gateway under its registration, the resource manager 105 may always forward the call to the proxy 104 to which it is registered. On the other hand, for a call request originating from the proxy 104, the resource manager 105 may select a proper gateway based upon a pre-determined policy. For example, the resource manager 105 may select a gateway using a round robin, first available, or load balancing policy. Other examples of selection policies are possible.

The resource manager 105 may support registration from multiple gateways. These multiple gateways may or may not terminate the same trunk group. The registration procedures may comply with the SIP protocol.

The resource manager 105 may register to the proxy 104 on behalf of a logical gateway as long as there is a gateway registered to the resource manager 105. This procedure of registration may ensure that there are always valid DS0 s associated with the logical gateway. Further, the resource manager 105 may initiate only one registration for every trunk group that is under the control of the resource manager 105 and, therefore, the number of registrations or logical gateways may be equal to the number of trunk groups rather than the total number of physical gateways.

A configuration table may be stored at the resource manager 105. The configuration table may be used to define a logical gateway. In one example, the configuration table may include a plurality of entries. Each entry of the configuration table may have an index and represent a trunk group. Each entry of the configuration table may also have information that relates the trunk group to a logical gateway and include the transport address of the logical gateway. (e.g., an IP address and a transport port). The entry of the configuration table may also include the addresses of the physical gateways belonging to the trunk group.

Figure 2A:
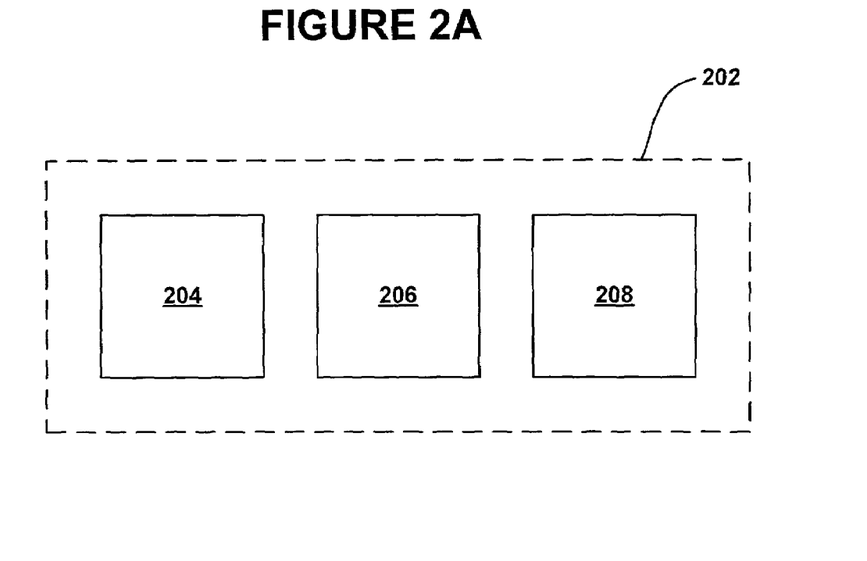
FIG. 2a is a diagram illustrating logical and physical gateways in accordance with a preferred embodiment of the present invention.

Referring to FIG. 2a, one example of a gateway is illustrated. A logical gateway 202 includes physical gateways 204, 206, and 208. Each of the physical gateways 204, 206, and 208 may have different addresses and the physical gateways may share a logical transport address.

Figure 2B:
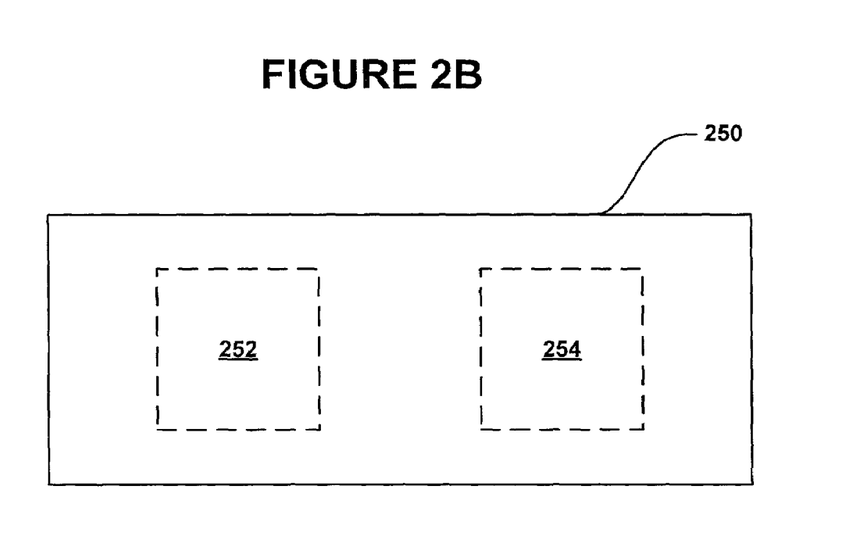
FIG. 2b is a diagram illustrating logical and physical gateways in accordance with a preferred embodiment of the present invention.

Referring to FIG. 2b, another example of a gateway is illustrated. A physical gateway 250 includes logical gateways 252 and 254. The logical gateways 252 and 254 may be different addresses and the physical gateway 250 may have its own address.

Figure 3A:
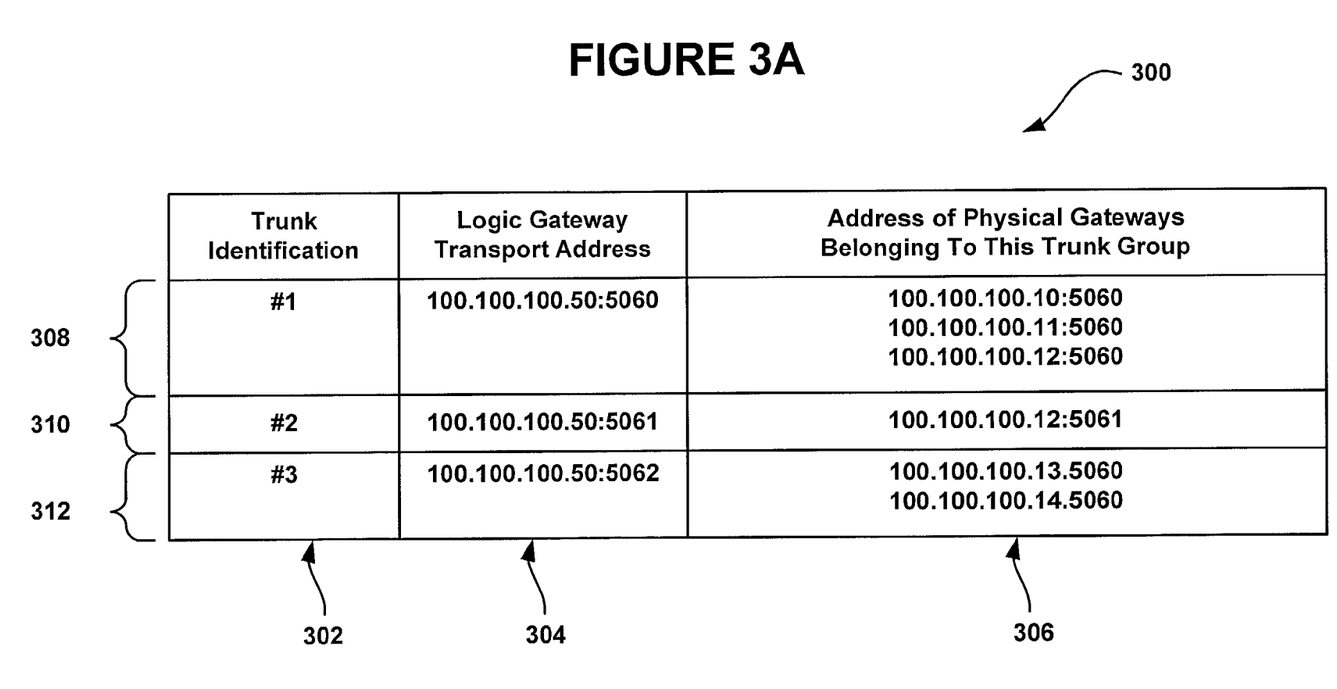
FIG. 3a is a diagram illustrating a configuration table in accordance with a preferred embodiment of the present invention.

Referring now to FIG. 3a, one example of a configuration table 300 includes a trunk identification column 302, a logical gateway transport address 304, and an address of physical gateways belonging to the trunk group column 306. In this example, the table includes rows 308, 310, and 312.

In this example, the row 308 includes trunk group ID "1". The trunk group ID "1" has a logical gateway address of "100.100.100.50:5060." The logical gateway address "100.100.100.50:5060" includes three physical gateways having addresses of "100.100.100.10:5060", "100.100.100.11:5060", and "100.100.100.12:5060." The row 310 includes trunk group ID "2". The trunk group ID "2" has a logical gateway address of "100.100.100.50:5061." The logical gateway address "100.100.100.50:5061" includes one physical gateway having an address of "100.100.100.12:5061".

The trunk group ID "3" has a logical gateway address of "100.100.100.50:5062." The logical gateway address "100.100.100.50:5062" includes two physical gateways having addresses of "100.100.100.13:5060", and "100.100.100.14:5060".

Thus, in this example, there are five physical gateways and three trunk groups or logical gateways. The trunk groups/logical gateways are identified by the transport address. One physical gateway, addressed at "100.100.100.12" (with addresses 100.100.100.12:5060 and 100.100.100.12:5061) spreads over trunk groups 1 and 2, and this physical gateway uses two different transport addresses to register with the resource manager. In addition, trunk groups 1 and 3 contain multiple physical gateways. The logical gateway definition only affects the resource manager and the server. Each physical gateway is not aware of the trunk group to which it is attached. In cases where there are multiple resource managers, the number of resource managers in the network will be much smaller than the number of physical gateways, modifications to the number of trunk groups can be easily accomplished. For example, trunk lines can be deleted, new physical gateways may be added to an existing trunk group. No modification to the central directory structure would be required.

Figure 3B:
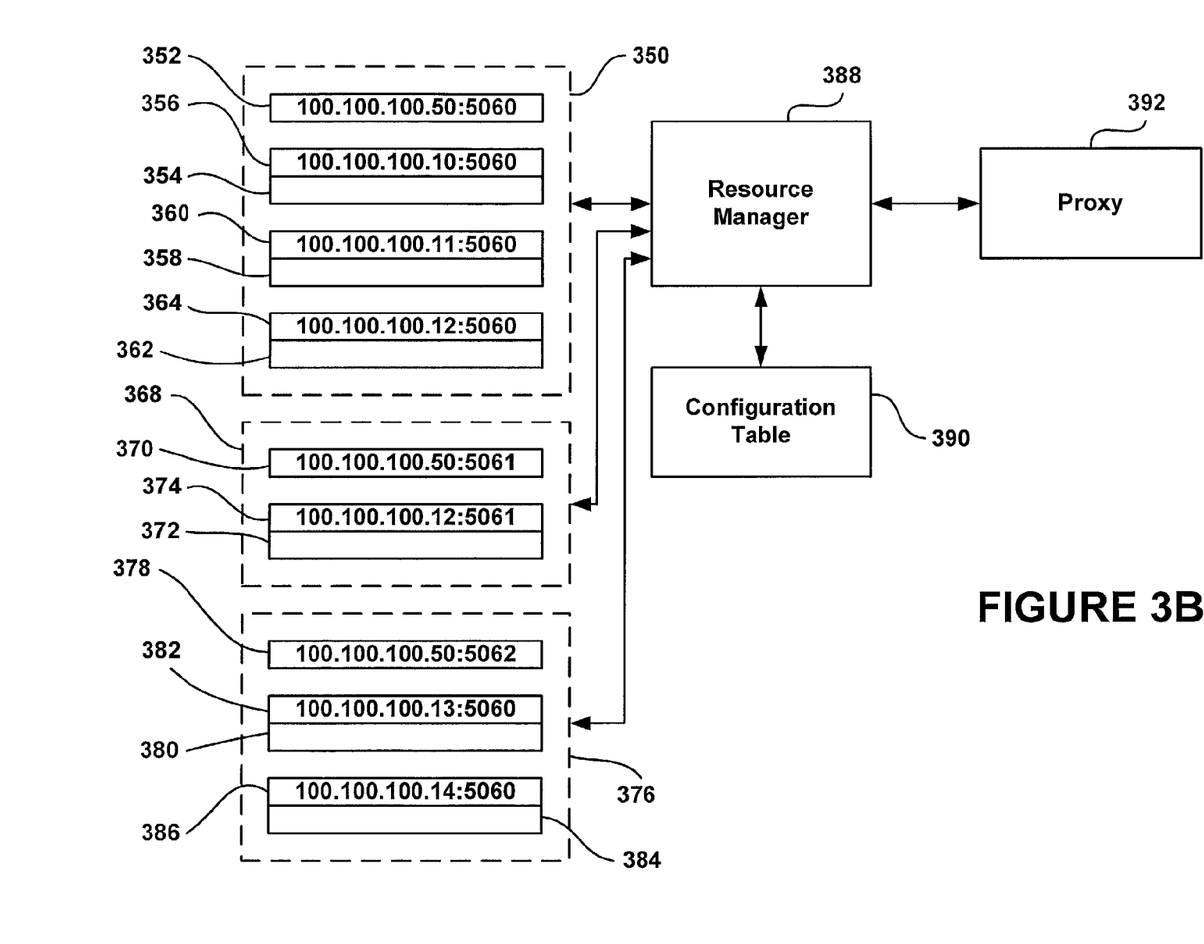
FIG. 3b is a diagram illustrating a system corresponding to the configuration table of FIG. 3a in accordance with a preferred embodiment of the present invention.

Referring now to FIG. 3b, one example of a system corresponding to the configuration table of FIG. 3a is described. A system includes a logical gateway 350, a logical gateway 368, a logical gateway 376, a resource manager 388, a configuration table 390, and a proxy 392. The local gateways 350, 368, and 376 are coupled to the resource manager 388. The resource manager 388 is coupled to the configuration table 390 and the proxy 392.

The logical gateway 350 includes a logical transport address field 352. In this example, this field is set to "100.100.100.50:5060." The logical gateway 368 includes a logical transport address field 370. In this example, this field is set to "100.100.100.50:5061." The logical gateway 376 includes a logical transport address field 378. In this example, this field is set to "100.100.100.50:5062."

The logical gateway 350 includes physical gateways 354, 358, and 362. Respectively, these gateways have address fields 356, 360, and 364. Respectively, in this example, these fields are set to "100.100.100.10:5060", "100.100.100.11:5060", and "100.100.100.12:5060."

The logical gateway 368 includes a physical gateway 372. This gateway has an address field 374. In this example, this field is set to "100.100.100.12:5061".

The logical gateway 376 includes physical gateways 380 and 384. Respectively, these gateways have address fields 382 and 386. Respectively, in this example, these fields are set to "100.100.100.13:5060" and "100.100.100.14:5060".

The configuration table 390 may be the configuration table as described with relation to FIG. 3a. The functions of the resource manager 388, proxy 392, and physical and logical gateways may be the same functions as those described with respect to these elements elsewhere in this specification.

Figure 4:
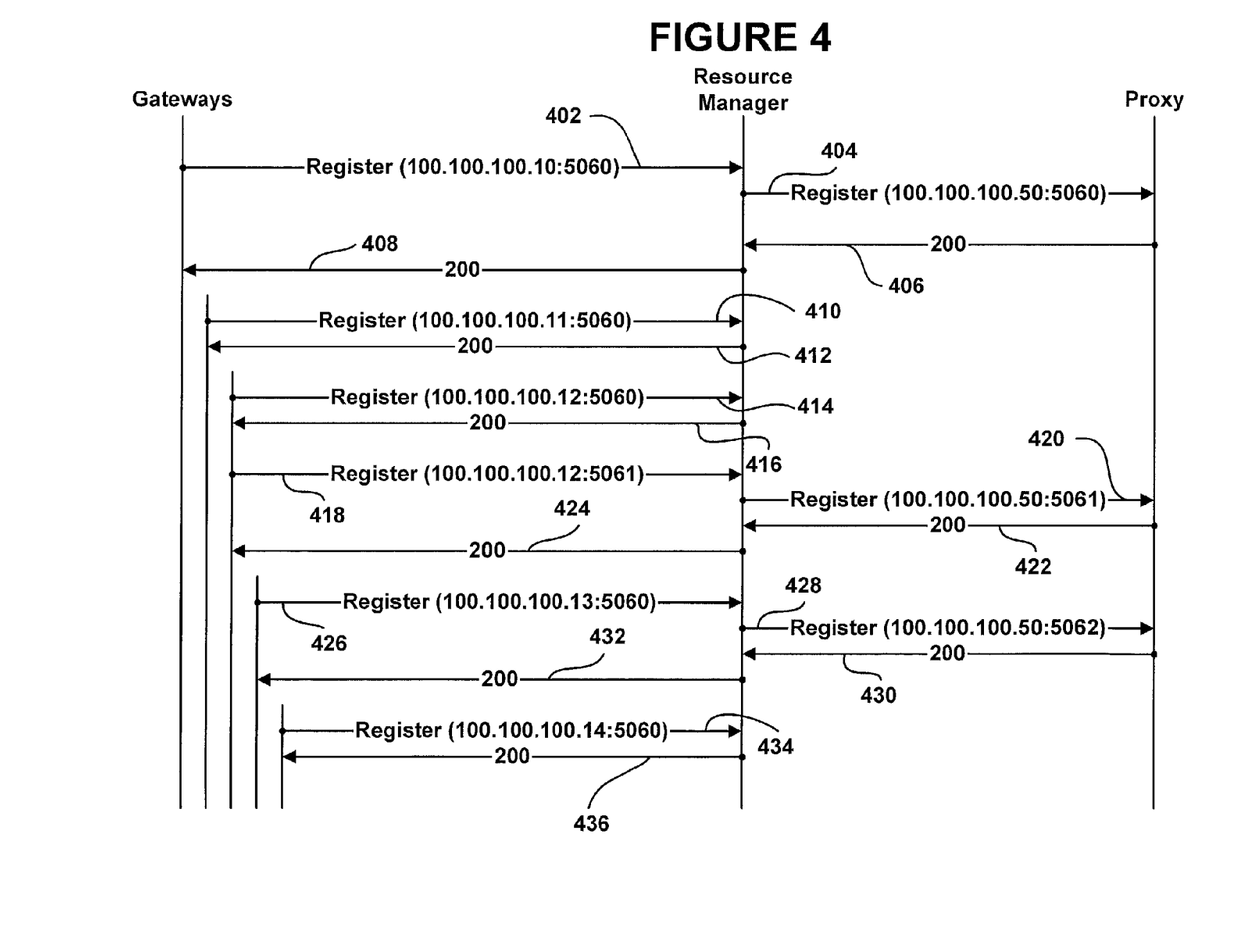
FIG. 4 shows a call flow diagram illustrating a registration process in accordance with a preferred embodiment of the present invention.

Referring now to FIG. 4, one example of a registration process is described. For purposes of this example, the configuration table of FIG. 3a and the system of FIG. 3b may be used.

At step 402, a register message is sent from the gateway to the resource manager from a gateway. The message includes the address of the physical gateway, in this case "100.100.100.10:5060." The resource manager receives the message, and examines the configuration table for the logical address of the physical gateway. For example, the logical address "100.100.100.50:5060" may correspond to this physical address. This logical address is included in the register message. At step 404, this register message is send to the proxy.

At step 406, the proxy sends an acknowledgement message to the resource manager. For example, the acknowledgement may be "200." At step 408, the resource manager sends the acknowledgement to the gateway.

At step 410, the physical gateway with address "100.100.100.11:5060" sends a registration request message to the resource manager. The resource manager consults the configuration table. The physical gateway with address "100.100.100.11:5060" has the corresponding logical address of "100.100.100.50:5060" and is in the same trunk group as the physical gateway with address "100.100.100.10:5060." Consequently, the registration message is not passed on to the proxy. Instead, the acknowledgement, for example, "200" is passed back to the gateway at step 412.

At step 414, the physical gateway with address "100.100.100.12:5060" sends a registration request message to the resource manager. The resource manager consults the configuration table. The physical gateway with address "100.100.100.12:5060" has the corresponding logical address of "100.100.100.50:5060" and is in the same trunk group as the physical gateway with address "100.100.100.10:5060" and "100.100.100.11:5060." Consequently, the registration message is not passed on to the proxy. Instead, the acknowledgement, for example, "200" is passed back to the gateway at step 416.

At step 418, the physical gateway with address "100.100.100.12:5061" sends a registration request message to the resource manager. The resource manager consults the configuration table. The physical gateway with address "100.100.100.12:5061" has the corresponding logical address of "100.100.100.50:5061." Consequently, the registration message is passed on to the proxy at step 420. At step 422, the acknowledgement, for example, "200" is passed back to the resource manager. At step 424, the acknowledgement is passed back to the gateway.

At step 426, the physical gateway with address "100.100.100.13:5060" sends a registration request message to the resource manager. The resource manager consults the configuration table. The physical gateway with address "100.100.100.13:5060" has the corresponding logical address of "100.100.100.50:5062." Consequently, the registration message is passed on to the proxy at step 428. At step 430, the acknowledgement, for example, "200" is passed back to the resource manager. At step 432, the acknowledgement is passed back to the gateway.

At step 434, the physical gateway with address "100.100.100.14:5060" sends a registration request message to the resource manager. The resource manager consults the configuration table. The physical gateway with address "100.100.100.14:5060" has the corresponding logical address of "100.100.100.50:5062" and is in the same trunk group as the physical gateway with address "100.100.100.13:5060." Consequently, the registration message is not passed on to the proxy. Instead, the acknowledgement, for example, "200" is passed back to the gateway at step 436.

The gateway also may attach the load information in the REGISTER message. For example, if a SIP message gateway is configured to use 300 DS0 lines of which 100 are currently free and the gateway must reserve 20 free DS0 lines for incoming calls, then additional headers may be added to the REGISTER message. A field may be included called "CwNumFreePorts" and set equal to 100. A "CwTotalPorts" may be set equal to 300. A CwReservedInboundPorts field may be set to 20.

The gateway may be responsible for repeating the REGISTER message not only for keep alive purposes but also to update the real-time load information. When the load changes significantly within the keep alive period, the gateway may send a REGISTER message with new information immediately. Thus, the resource manager may always have precise knowledge of the gateway load at any given time that is very useful for call routing and load balancing functions.

Figure 5:
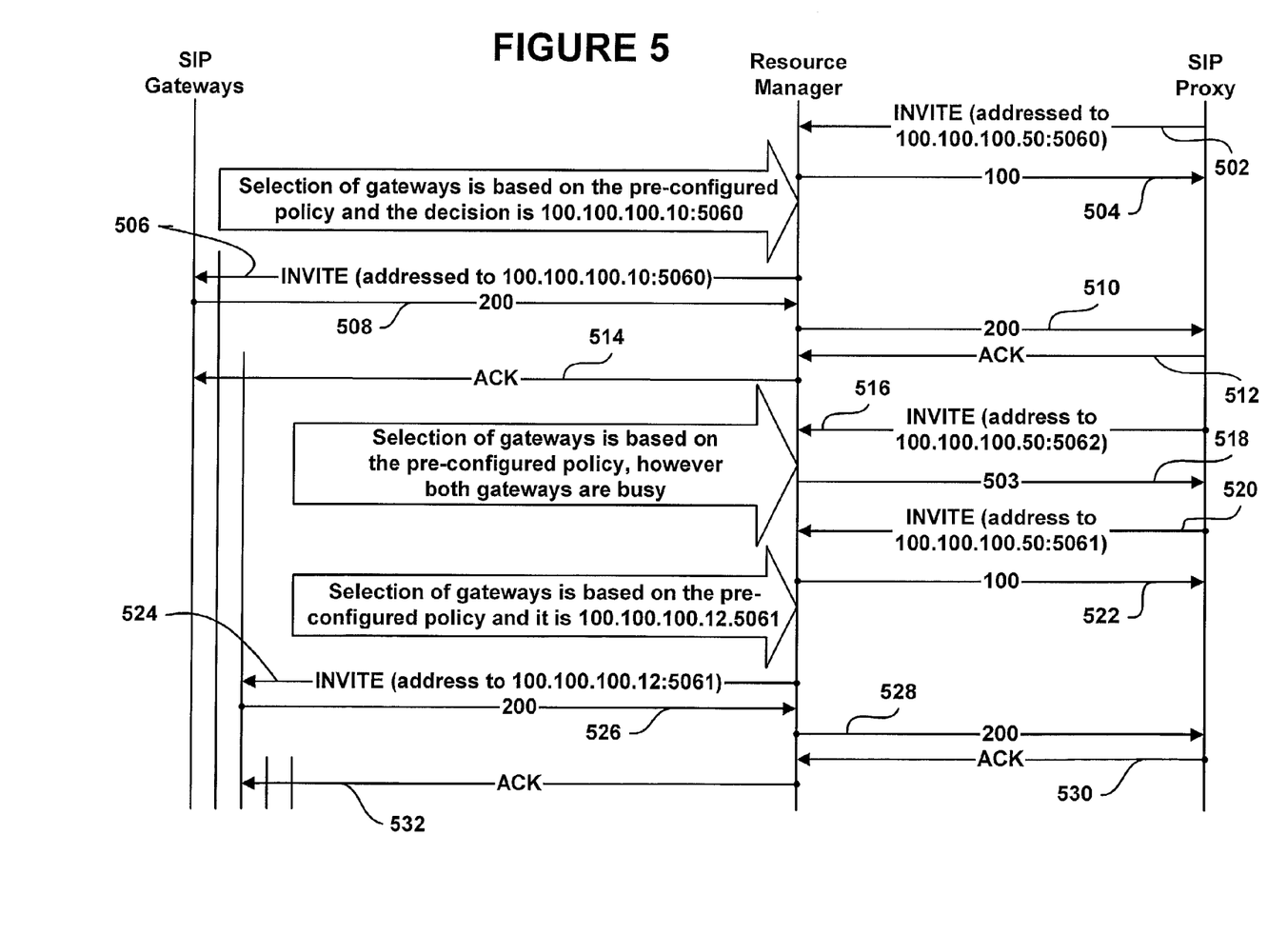
FIG. 5 is a call flow diagram illustrating an invitation process in accordance with a preferred embodiment of the present invention.

Referring now to FIG. 5, when a call comes from a gateway to the resource manager, an INVITE message may be forwarded to the proxy without changing the address information. A message transaction is the complete sequence of request/response/acknowledgement of a particular request. The far-end may, for example, be the other entity involved in the call. When a response is received from the proxy, the resource manager may forward the response back to the originating gateway. The message transactions may continue until the call is connected between the gateway and the far end. During the call setup process, the resource manager may act like the proxy from the perspective of both the gateway and the proxy. For purposes of this example, the configuration table of FIG. 3a and the system of FIG. 3b may be used.

When a call originates from the proxy and the call is addressed to one of the gateways, the resource manager may determine which physical gateway belonging to this logical gateway is to receive the request by using any of the predetermined policies or algorithms. The choice of policy usually depends on the system load condition as well as the operation practice.

At step 502, an INVITE message is sent from the proxy to the resource manager. For example, the message may be addressed to "100.100.100.50:5060." At step 504, the resource manager sends a reply message, for example "100", to the proxy. At this point, selection of the gateways may be based upon the pre-configured policy. For example, the decision may be "100.100.100.10:5060."

At step 506, the resource manager sends the INVITE message, now addressed to "100.100.100:10:5060" to the gateway. The gateway sends a reply, for example, "200", to the resource manager at step 508. At step 510, the resource manager forwards the reply to the proxy. At step 512, the proxy sends an acknowledgement to the resource manager. At step 514, the acknowledgement is sent from the resource manager to the gateway.

At step 516, an INVITE message, for example, addressed to "100.100.100.50:5062", is sent from the proxy to the resource manager. At this point, the selection of gateways is based upon the pre-configured policy. However, both gateways are busy. At step 518, a "503" message indicating that the resource is unavailable is sent from the resource manager to the proxy.

At step 520, an INVITE message, for example, addressed to "100.100.100.50:5061", is sent from the proxy to the resource manager. At step 522, an acknowledgement, for example, "100", is sent from the resource manager to the proxy. At this point, the selection of gateways is based upon the pre-configured policy and the selection made is "100.100.100.12:5061."

At step 524, an INVITE message, now addressed to "100.100.100.12:5061" is sent from the resource manager to the gateway. At step 526, a reply "200" is sent from the gateway to the resource manager. At step 528, the "200" is sent from the resource manager to the proxy. At step 530, an acknowledgement is sent from the proxy to the resource manager. At step 532, the acknowledgement is sent to the gateway.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for transmitting information in a network may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for managing VoIP trunk groups in a plurality of physical gateways, the system comprising:
    a resource manager, the resource manager including a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group, the resource manager being coupled to a plurality of physical gateways;
    wherein the resource manager translates physical gateway register request messages received from the physical gateways into logical gateway register request messages by (i) receiving a physical gateway register request message from a given one of the plurality of physical gateways, the received physical gateway register request message including a physical gateway address of the given one of the plurality of physical gateways, (ii) responsively determining the logical identifier corresponding to the physical gateway address of the given one of the plurality of physical gateways, and (iii) sending the logical gateway register request message including the logical identifier to a proxy, wherein the logical gateway register request message indicates to the proxy the availability of the logical gateway to process VoIP traffic.

2. The system of claim 1, wherein the resource manager receives a first INVITE message from the proxy, the first INVITE message includes a received logical identifier, the resource manager uses at least one policy for determining a selected physical gateway having a physical gateway address that corresponds to the received logical identifier, and the resource manager sends a second INVITE message to the selected physical gateway.

3. The system of claim 1, wherein each of the plurality of physical gateways is coupled to the PSTN.

4. The system of claim 1 wherein the proxy is coupled to the Internet.

5. The system of claim 1, wherein the VoIP trunk group includes at least one trunk in each of two or more of the plurality of physical gateways.

6. The system of claim 1, wherein the proxy is coupled to the resource manager.

7. The system of claim 1, wherein the logical identifier includes an internet protocol address and a transport port.

8. The system of claim 1, wherein the physical gateway register request message received at the resource manager includes load information that indicates the real-time load of the given one of the plurality of physical gateways.

9. The system of claim 2, wherein the first INVITE message and the second INVITE message are arranged according to a session initiation protocol.

10. The system of claim 2, wherein the received logical identifier is the same as the logical identifier corresponding to the physical gateway address of the given one of the plurality of physical gateways.

11. A method for managing VoIP trunk groups in a plurality of physical gateways, the method comprising:
    establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;
    receiving a first physical gateway register request message from a given one of a plurality of physical gateways, the received physical gateway register request message including a physical gateway address of the given one of the plurality of physical gateways;

responsively determining the logical identifier corresponding to the physical gateway address of the given one of the plurality of physical gateways, sending a logical gateway register request message including the logical identifier to a proxy, wherein the logical gateway register request message indicates to the proxy the availability of the logical gateway to process VoIP traffic;

receiving one or more subsequent physical gateway register request messages from any of the plurality of physical gateways having the same logical identifier as the given one of the plurality of physical gateways; and withholding, from the proxy, the one or more subsequent physical gateway register request messages received from any of the plurality of physical gateways having the same logical identifier as the given one of the plurality of physical gateways.

12. The method of claim 11, further comprising:

receiving a first INVITE message from the proxy, wherein the first INVITE message includes the same logical identifier as the given one of the plurality of physical gateways;

determining a physical gateway address of a selected one of the plurality of physical gateways, wherein the logical identifier for the selected one of the plurality of physical gateways is the same as the logical identifier received in the first INVITE message; and sending a second INVITE message to the physical gateway address of the selected one of the plurality of physical gateways.

13. The method of claim 11 further comprising communicating with the PSTN.

14. The method of claim 11 further comprising communicating with the Internet.

15. The method of claim 12, wherein the selected one of the plurality of physical gateways is selected based at least in part on one or more policies for selecting a physical gateway, and the one or more policies include policies selected from the group of (i) a round-robin policy, (ii) a first available policy, and (iii) a load balancing policy.

16. A system for routing information comprising:

a resource manager including a configuration table for grouping a plurality of physical gateways into a logical gateway to act as a VoIP trunk group, the configuration table including at least one group of physical SIP gateway addresses, each of the at least one group of physical SIP gateway addresses having a single and unique logical identifier representing a VoIP trunk group; and wherein the resource manager uses the configuration table to translate physical gateway requests messages into logical gateway request messages, and to translate SIP INVITE messages specifying a logical gateway into SIP INVITE messages specifying a physical gateway.

17. The system of claim 16, wherein the resource manager translates physical gateway register request messages received from the physical gateways into logical gateway register request messages by (i) receiving a physical gateway register request message from a given one of the plurality of physical gateways, the received physical gateway register request message including a physical gateway address of the given one of the plurality of physical gateways, (ii) responsively determining the logical identifier corresponding to the physical gateway address of the given one of the plurality of physical gateways, and (iii) sending the logical gateway register request message including the logical identifier to a proxy, wherein the logical gateway register request message indicates to the proxy the availability of the logical gateway to process VoIP traffic.

18. A method for managing VoIP trunk groups in a plurality of physical gateways, the method comprising:

establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;

receiving a first physical gateway register request message from a given one of a plurality of physical gateways, the received physical gateway register request message including a physical gateway address of the given one of the plurality of physical gateways;

responsively determining the logical identifier corresponding to the physical gateway address of the given one of the plurality of physical gateways, sending a second logical gateway register request message including the logical identifier to a proxy, wherein the logical gateway register request message indicates to the proxy the availability of the logical gateway to process VoIP traffic.

19. The method of claim 18 further comprising:

receiving one or more subsequent physical gateway register request messages from any of the plurality of physical gateways having the same logical identifier as the given one of the plurality of physical gateways; and withholding, from the proxy, the one or more subsequent physical gateway register request messages received from any of the plurality of physical gateways having the same logical identifier as the given one of the plurality of physical gateways.

20. A system for managing VoIP trunk groups in a plurality of physical gateways, the system comprising:

means for establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;

means for receiving a physical gateway register request message from a given one of a plurality of physical gateways, the received physical gateway register request message including a physical gateway address of the given one of the plurality of physical gateways;

means for responsively determining the logical identifier corresponding to the physical gateway address of the given one of the plurality of physical gateways, means for sending a logical gateway register request message including the logical identifier to a proxy, wherein the logical gateway register request message indicates to the proxy the availability of the logical gateway to process VoIP traffic;

means for receiving one or more subsequent physical gateway register request messages from any of the plurality of physical gateways having the same logical identifier as the given one of the plurality of physical gateways; and means for withholding, from the proxy, the one or more subsequent physical gateway register request messages received from any of the plurality of physical gateways having the same logical identifier as the given one of the plurality of physical gateways.

21. The system of claim 20, further comprising:
means for receiving a first INVITE message from the proxy, wherein the first INVITE message includes a received logical identifier;
means for selecting a selected physical gateway having a physical gateway address that corresponds to the received logical identifier; and
means for sending a second INVITE message to the selected physical gateway.

22. The system of claim 20 further comprising means for communicating with the PSTN.

23. The system of claim 21, wherein the means for selecting a selected physical gateway includes one or more policies selected from the group consisting of (i) a round-robin policy, (ii) a first available policy, and (iii) a load balancing policy.

24. The system of claim 21, wherein the received logical identifier is the same as the logical identifier corresponding to the physical gateway address of the given one of the plurality of physical gateways.

25. A computer readable medium having stored therein instructions for causing a processing unit to execute the following method for managing VoIP trunk groups in a plurality of physical gateways:
establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;
receiving a physical gateway register request message from a given one of a plurality of physical gateways, the received physical gateway register request message including a physical gateway address of the given one of the plurality of physical gateways;
responsively determining the logical identifier corresponding to the physical gateway address of the given one of the plurality of physical gateways,
sending a logical gateway register request message including the logical identifier to a proxy, wherein the logical gateway register request message indicates to the proxy the availability of the logical gateway to process VoIP traffic.

26. A computer readable medium having stored therein instructions for causing a processing unit to execute the following method for managing VoIP trunk groups in a plurality of physical gateways:
establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;
receiving a physical gateway register request message from a given one of a plurality of physical gateways, the received physical gateway register request message including a physical gateway address of the given one of the plurality of physical gateways;
responsively determining the logical identifier corresponding to the physical gateway address of the given one of the plurality of physical gateways,
sending a logical gateway register request message including the logical identifier to a proxy, wherein the logical gateway register request message indicates to the proxy the availability of the logical gateway to process VoIP traffic;
receiving one or more subsequent physical gateway register request messages from any of the plurality of physical gateways having the same logical identifier as the given one of the plurality of physical gateways; and
withholding, from the proxy, the one or more subsequent physical gateway register request messages received from any of the plurality of physical gateways having the same logical identifier as the given one of the plurality of physical gateways.

27. A system for managing VoIP trunk groups in a plurality of physical gateways, the system comprising:
means for establishing a configuration table for grouping a plurality of physical gateways into a logical gateway to act as a VoIP trunk group, the configuration table including at least one group of physical gateway addresses, each of the at least one group of physical gateway addresses having a single and unique logical identifier representative of a VoIP trunk group;
means for receiving a physical gateway register request message from a given one of a plurality of physical gateways, the received physical gateway register request message including a physical gateway address of the given one of the plurality of physical gateways;
means for responsively determining the logical identifier corresponding to the physical gateway address of the given one of the plurality of physical gateways; and
means for sending a logical gateway register request message including the logical identifier to a proxy, wherein the logical gateway register request message indicates to the proxy the availability of the logical gateway to process VoIP traffic.

28. The system of claim 27 further comprising:
means for receiving one or more subsequent physical gateway register request messages from any of the plurality of physical gateways having the same logical identifier as the given one of the plurality of physical gateways; and
means for withholding, from the proxy, the one or more subsequent physical gateway register request messages received from any of the plurality of physical gateways having the same logical identifier as the given one of the plurality of physical gateways.

* * * * *